July 4, 1950
W. R. WALTNER, JR
2,514,171
ELECTRIC CIGARETTE LIGHTER
Filed Oct. 1, 1947
4 Sheets-Sheet 1
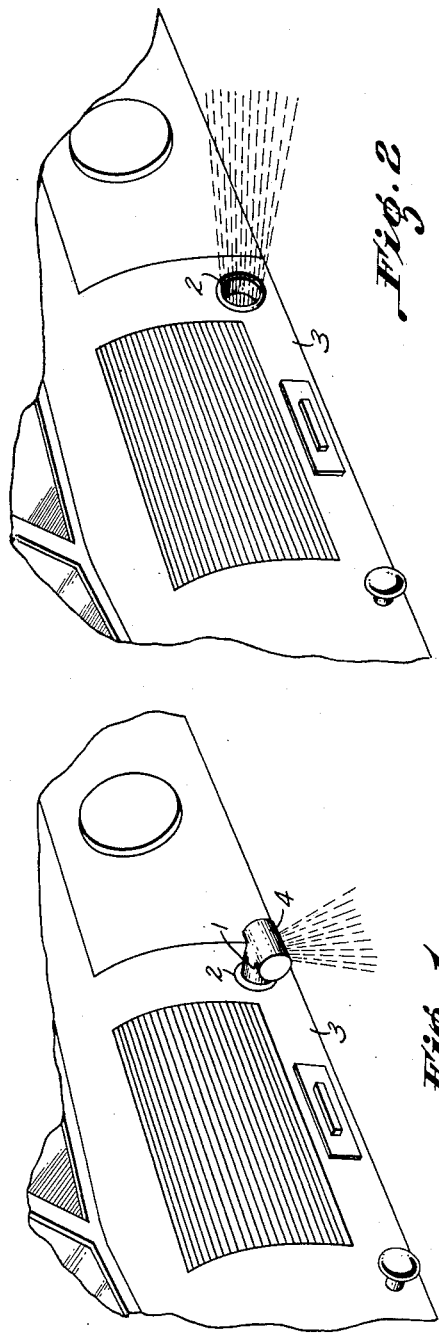
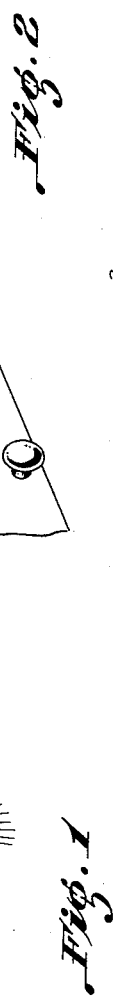
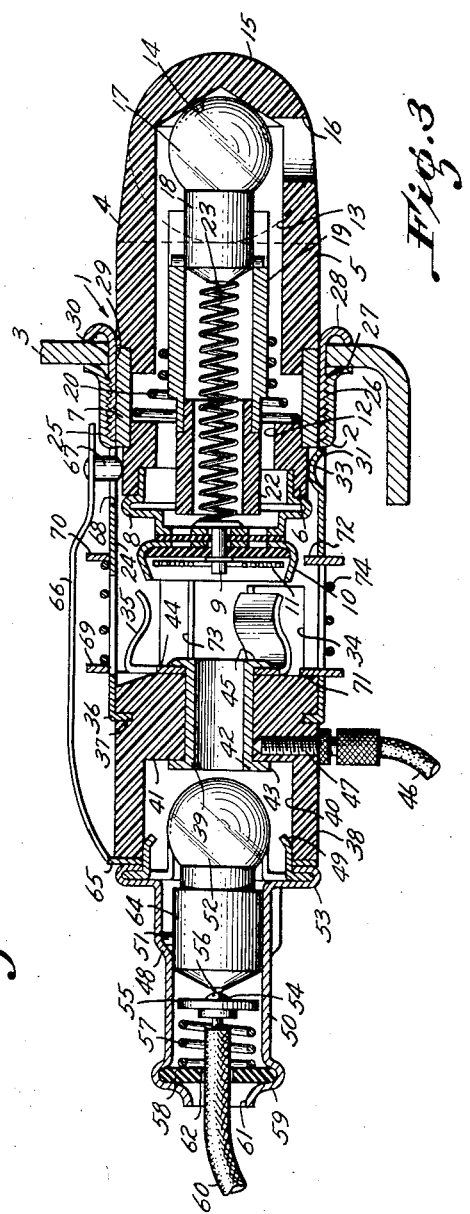
Inventor:
WILFRED R. WALTNER, JR.
By Fishburn & Mullendore
Attorneys July 4, 1950 W. R. WALTNER, JR 2,514,171
ELECTRIC CIGARETTE LIGHTER
Filed Oct. 1, 1947 4 Sheets-Sheet 2
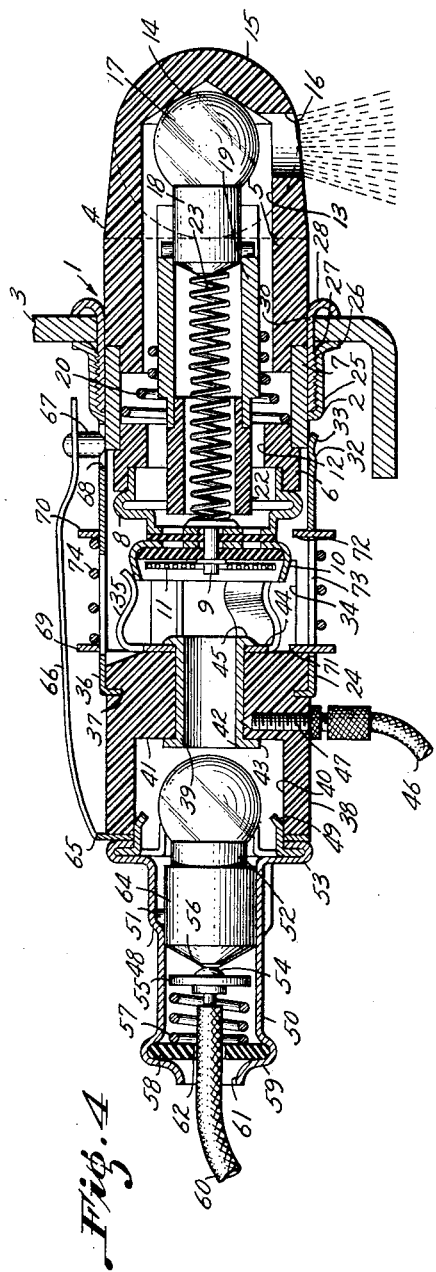
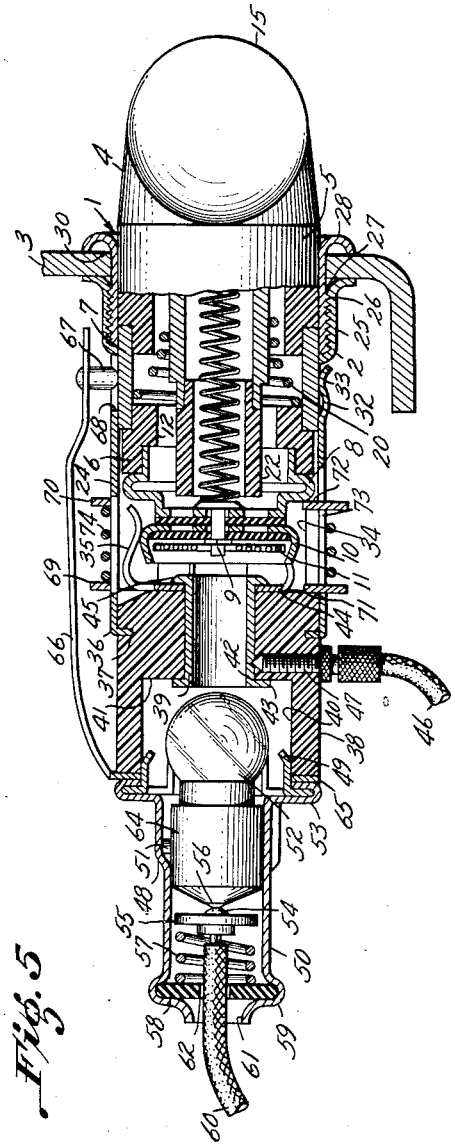
Inventor:
WILFRED R. WALTNER, JR.
BY Fishburn & Mullendore
Attorneys

July 4, 1950 W. R. WALTNER, JR 2,514,171
ELECTRIC CIGARETTE LIGHTER
Filed Oct. 1, 1947 — 4 Sheets-Sheet 3
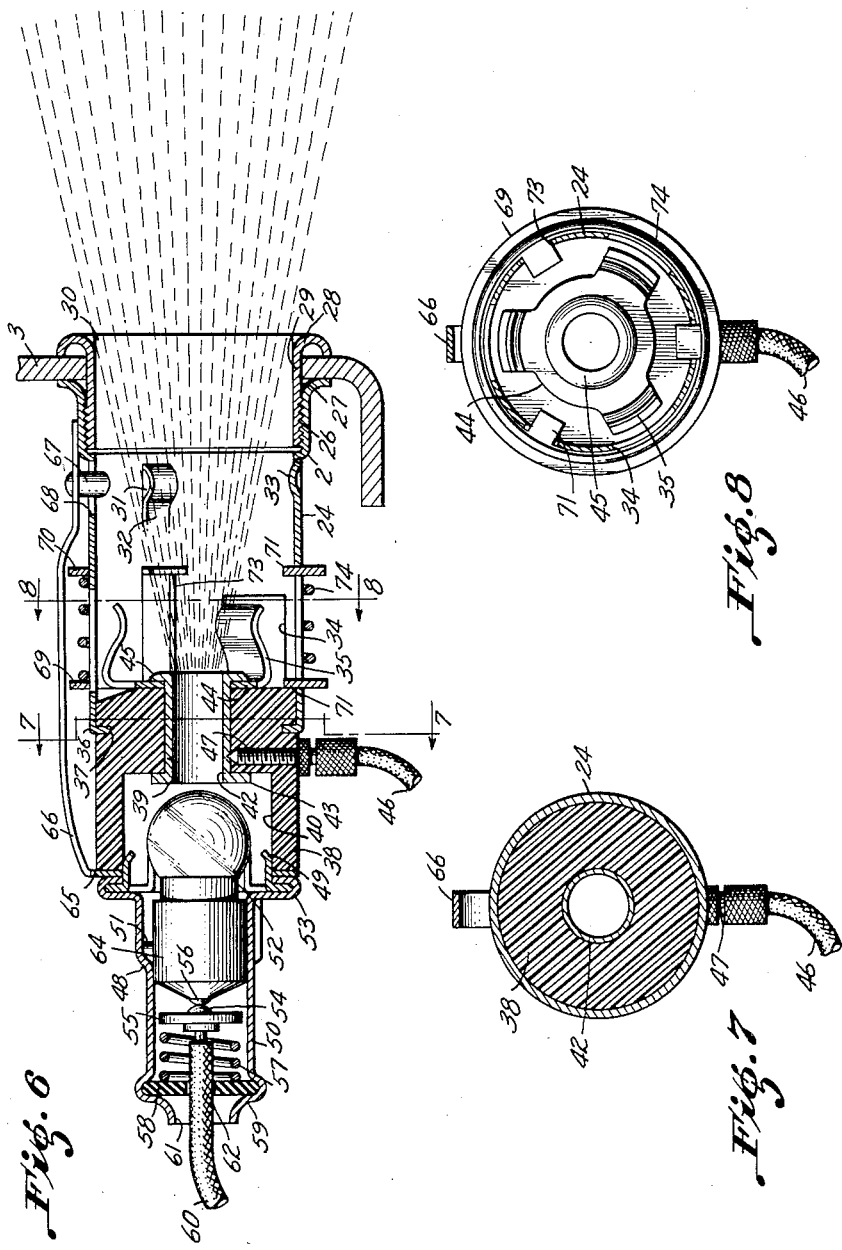
Inventor:
WILFRED R. WALTNER, JR.
BY Fishburn & Mullendore
Attorneys July 4, 1950

W. R. WALTNER, JR 2,514,171

ELECTRIC CIGARETTE LIGHTER

Filed Oct. 1, 1947

Inventor:
WILFRED R. WALTNER, JR.
By Fishburn & Mullendore
Attorneys

Patented July 4, 1950

2,514,171

UNITED STATES PATENT OFFICE 2,514,171

ELECTRIC CIGARETTE LIGHTER

Wilfred R. Waltner, Jr., Colorado, Springs, Colo.

Application October 1, 1947, Serial No. 777,265

5 Claims. (Cl. 219—32)

This invention relates to cigar lighters and holding devices therefor, and more particularly to such devices as are used in automobiles and the like, and has for its principal object to provide for directing a beam of light from the lighter and from the holder when the lighter igniting unit is removed therefrom.

There have been various arrangements of lights under the instrument panel of an automobile for indicating to persons in the vehicle the location of the various devices on the panel but usually such lights are relatively dim and due to offset location from the openings for the devices, it is difficult for the driver to locate the receptacles for the devices without diverting his attention from the road. Also such lights burn out and due to the structure and location of the sockets it is usually difficult to replace them, and the owners are slow in having replacements made, with the result that even though some facilities have been provided for assisting in finding the receptacles on the instrument panel, they are not maintained in proper condition and do not function to serve that purpose. Also, most automobiles have dome lights or the like for use in reading maps and other objects, but such lights provide little illumination yet cause a reflection on the windshield, interfering with the driver's vision.

Other objects of the present invention are to provide direct illumination through the lighter igniting unit receptacle during the time the igniting unit is removed for use whereby the user will have no difficulty in locating the receptacle without looking in the direction of same; to provide a control for the illuminating means responsive to insertion of the igniting unit in the receptacle whereby said illuminating means is inoperative when the said igniting unit is located in the receptacle; to provide illumination in a receptacle for automatic cigar lighters; to provide a lighter receptacle with a snap-in-type light bulb socket permitting ease of removal and replacement; to provide a light bulb mounting on the lighter receptacle whereby all the light rays from said bulb are directed through the receptacle; to provide an arrangement of spring contact points adapted to make electrical contact with the heating element of the igniting unit, holding said igniting unit during the heating of said element and releasing same when the heating element has reached a predetermined temperature, said spring contact point being so arranged as to permit passage of light therethrough; to provide a lighter igniting unit with a light bulb and suitable electrical contacts for forming a directed beam of light for map reading and the like; to provide a light bulb and igniting unit in a cigar lighter with electrical connections whereby operation of one or the other is effected according to the degree of movement of the lighter into the holder; and to provide illumination for a receptacle for automatic lighters of simple, durable structure, of relatively few parts, easily assembled, and capable of efficient trouble-free operation, serving as a shielded light source when the igniting unit is removed from said holder.

In accomplishing these and other objects of the present invention, I have provided improved details of structure, the preferred forms of which are illustrated in the accompanying drawings, wherein:

Fig. 1 is a perspective view of a portion of an automobile instrument panel illustrating the light rays emitting from the cigar lighter which has been partially moved into the receptacle.

Fig. 2 is a perspective view similar to Fig. 1 illustrating the light rays emitting from the lighter receptacle, the igniting unit being removed therefrom.

Fig. 3 is a longitudinal sectional view through a lighter receptacle and illuminating means, the igniting unit being illustrated as located in the holder in retracted or storage position.

Fig. 4 is a sectional view similar to Fig. 3, the igniting unit being illustrated as located in the circuit-completing position for energizing the illuminating means in the igniting unit.

Fig. 5 is a sectional view similar to Fig. 3, the igniting unit being illustrated as in circuit-completing position for energizing the heating element in the igniting unit.

Fig. 6 is a longitudinal sectional view through the receptacle and illuminating means illustrating the position of the circuit control for energizing the illuminating means when the igniting unit is removed from the socket.

Fig. 7 is a transverse sectional view on the line 7—7, Fig. 6.

Fig. 8 is a transverse sectional view on the line 8—8, Fig. 6.

Figure 9:
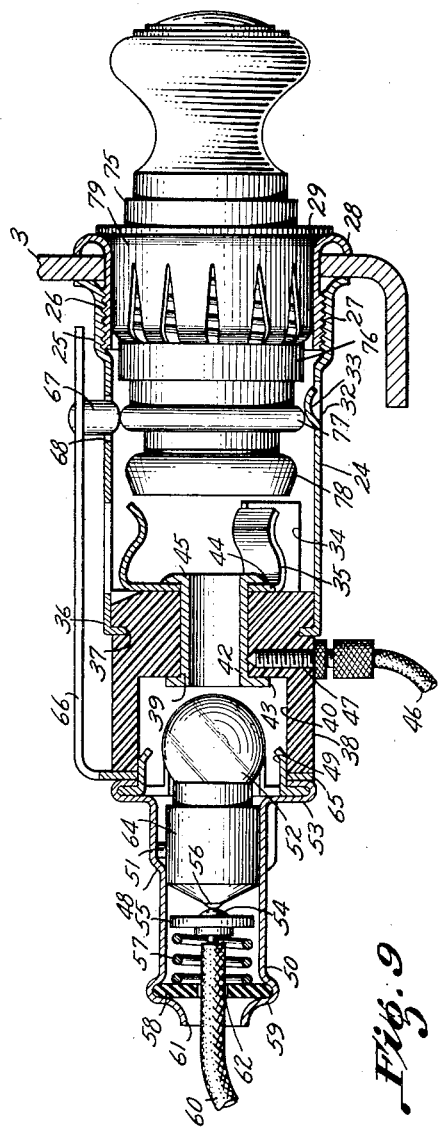
Fig. 9 is a longitudinal sectional view through a modified form of lighter receptacle and illuminating means, the igniting unit being illustrated as located in the holder in retracted or storage position.

Referring more in detail to the drawings:

1 designates a cigar lighter consisting of a sleeve-type holder or receptacle 2, adapted for mounting in and attachment to an instrument panel 3 of an automobile, and a removable igniting unit 4 of the plug type which is normally carried within the receptacle formed by the holder 2, said plug being movable in the socket to a circuit-making position for energizing the heating element in said igniting device, and after reaching a desired temperature removed for use of the occupant of the automobile for lighting cigarettes, cigars and the like. After such use the igniting device is returned to the receptacle and inserted to a retracted or storage position for retention until further use if desired.

The removable igniting element 4 consists of spaced body members 5 and 6 preferably formed of insulating material such as plastic or the like. The members are connected by a metal sleeve 7 mounted on reduced portions of the adjacent ends of said body members whereby the member 5 forms the handle of the igniting member. The body member 6 carries on the inner end thereof a metal ferrule 8 to which is mounted by a suitable rivet 9 a metal cup 10 for containing a wire heating element 11 therein. One end of the heating element 11 is connected to the metal cup 10 and the other end connected to rivet 9 forming the central pole member and having electrical connection with the metal ferrule 8, said ferrule being insulated from direct contact with the metal cup 10. The body member 6 has a through axial bore 12 aligning with a socket 13 in the member 5, said socket preferably terminating in a cone-shaped seat 14 adjacent the outer end 15 of said member and intersecting a transverse opening 16 in the wall of the member 5. A light bulb 17 preferably engages the seat 14 whereby the filament aligns with the opening 16, and the socket member 18 is mounted in a metal tube 19 arranged in coaxial relation to the body member. The inner end of the tube 19 is supported by a spiral spring 20 having engagement with the outer surface of said tube and the inner surface of the sleeve 7 between the body members 5 and 6. The inner end of the tube 19 is provided with an extension 22 of insulating material to prevent said metal tube from making contact with the ferrule 10. Mounted in the tube 19 and extension 22 is a compression spring 23 having one end engaging the rivet 9 and the other end the light bulb socket member 18 forming an electrical connection therebetween and holding the bulb in the seat 14.

The receptacle 2 consists of a cylindrical metal sleeve 24 having an enlarged forward portion 25 terminating in an outwardly directed flange at the outer end of the enlarged portion, the enlarged portion being provided with internal threads 26 adapted to be threadedly engaged with external threads 27 of a collar portion of a bushing 28, the outer end of said bushing being provided with a flange of substantially the same diameter as the flange on the sleeve. The bushing 28 is provided with a bore 29, substantially the same size as the bore of the sleeve 24 and of such size as to slideably receive the body member 5 and sleeve 7. The outer diameter of the collar of the bushing 28 is adapted to extend through an opening 30 in the instrument panel 3 of an automobile whereby the flange will engage the front face of said panel and the sleeve may be threaded on the collar until the flange on the sleeve 24 engages the inner surface of said panel to mount the sleeve thereon and provide electrical connection therebetween, said panel being connected with the ground side of the battery.

The sleeve 24 is preferably provided with a plurality of slots 31, forming fingers 32 extending toward the enlarged portion of the sleeve and terminating adjacent thereto in an inwardly directed portion 33 adapted to engage the metal sleeve 7 when the igniter member is moved into circuit-making position. The fingers 32 also resiliently engage the body member 6 when the igniting member is in its retracted or normal position for aiding in retaining the igniting member in the sleeve. The sleeve 24 has slots 34 adjacent the rear end thereof and extending toward the forward end sufficiently for providing clearance for the ends of spring terminals 35, the rear ends of the sleeve being turned inwardly forming a flange 36 adapted to seat in a groove 37 of a collar 38 to secure the sleeve to the collar and form the rear end of the socket for the igniting unit.

The collar 38 is preferably of cylindrical shape and of plastic or other suitable insulating material. The collar is provided with a bore 39 and is counterbored as at 40 at the rear end, forming a shoulder 41 substantially centrally of the length of the collar. Mounted in the bore 39 is a metal tubular member 42 having a flange 43 engaging the shoulder 41, said member 42 extending through the bore 39 and mounting a ring 44 carrying the terminals 35, the forward end of the tubular member 42 being flanged as at 45 to secure the ring against the forward end of the collar 38. The terminals 35 are preferably integral with the ring 44, extending outwardly and forwardly thereof and having resiliency for engaging the igniting unit and arranged for expansion of the ends of the terminal members in response to heat directed thereon. An electrical connection of a conductor 46 from a battery or other source of current is preferably formed by securing the terminal of the conductor to a screw 47 which is threaded into an opening in the collar 38 and has engagement with the metal tubular member 42 forming an electrical connection therewith.

A light bulb socket member 48 is preferably mounted in the counterbore 40 by means of spring fingers 49 on said socket member engaging the collar walls formed by said counterbore. The socket member 48 preferably consists of a tubular member 50 having a suitable connection, for example, a bayonet connection 51 with a light bulb 52 mounted in said socket, the tubular member terminating at its forward end in a flange 53 suitably shaped to engage spring fingers 49 for retaining same in the socket assembly. Electrical connection is made with the light bulb by means of a terminal 54 carried in a disk 55 of insulating material and resiliently urged toward the electrical terminal 56 of the light bulb by means of a spring 57, one end of which engages the disk 55 and the other a disk 58 retained in the tubular member 50 by suitably shaping the rear portion thereof as at 59. An electrical conductor 60 from the light circuit or other suitable source of current of the automobile extends into the open end 61 of the tubular socket member 48, through an opening 62 in the disk 58, and is electrically connected with the terminal 54. With this structure, electrical current is applied to the terminal 56 of the light bulb which is connected with the element thereof, the other end of said element being connected through socket portion 64 of the bulb having contact with the tubular member 59.

Mounted between the flange 53 and the rear face of collar 38 is a ring member 65, having an arm 66 extending forwardly in spaced relation to the collar 38, the forward end of the arm having a finger 67 of insulating material extending through an opening 68 in the sleeve 24 and engaging the outer periphery of the igniting unit to hold the end of the arm 66 spaced from the sleeve 24 when the igniting unit is in the sleeve and permit said arm, which is formed of spring metal, to make electrical contact with the sleeve 24 when the igniting unit is removed therefrom.

In order to make the lighter automatic with a single form of igniting unit, rings 69 and 70 are slideably mounted on the sleeve 24 and have lugs 71 and 72 extending through slots 73 in said sleeve, the lugs 71 on the ring 69 engaging the forward end of the collar 38 and the lugs 72 on the ring 70 engaging the forward end of the slots 73 when in normal position. A coil spring 74 is located between the rings 69 and 70 and urges said rings apart. This structure provides for exerting spring pressure on the igniting unit when and only when said unit is moved into the sleeve 24 sufficiently to complete the circuit to the heating coil in the igniter unit as shown in Fig. 5. This is only when the lugs 72 engage the ferrule 8.

In assembling a device constructed as described, the tubular member 42 is inserted in the bore 39 of the collar 38 and the ring 44 sleeved on the forward end of said tube, which is then flanged outwardly to secure the ring 44 and terminals in place. The screw 47 is threaded into the collar to make electrical contact with the tubular member. The rear end of the sleeve is engaged with the collar 38 with the flange 36 in the groove 37. A suitable conductor 46 having connection with the electrical circuit of the automobile is connected to the screw 47. The sleeve 24 is then applied to the instrument panel in alignment with the opening 30 therein and the bushing 28 inserted in said opening and threaded into the enlarged portion 25 of the sleeve to secure same to said instrument panel, the flanges of the sleeve and bushing engaging the rear and front faces of said panel respectively. A suitable conductor 60 is suitably connected with the terminal 54 of the disk 55 and extended through the bore 62 in the rear disk 58, the rear opening of the tubular socket 50 and suitably connected with the electrical circuit of the automobile. A light bulb 52 is then inserted in the socket for electrical connection with the terminal 54 and the socket. The fingers 49 are inserted into the counterbore of the collar whereby the fingers enter and resiliently engage said bore 40 at the rear portion of said collar to retain the socket therein, the flange 53 engaging the ring 65 and the bulb 52 extending into the bore 40. The ignition unit constructed as described is then placed into the sleeve 24, the fingers 32 engaging the body member 6, holding the igniting unit in retractive position, as shown in Fig. 3. In this position the fingers 67 engage the body member 6 of the igniting unit and the arm 66 is held in disengaged relation with the enlarged portion 25 of the sleeve. In this position there is an electrical connection between the conductor 60, terminals 54 and 56, light bulb 52, member 64 of said bulb, housing 50 of the socket, the flange 53 thereof, ring 65, and arms 66, but the contact portion of the arm 66 is retained out of engagement with the sleeve 24, therefore, no circuit is completed in that positon and the bulb will not be energized. The conductor 46 has electrical connection with the tubular member 42 and terminals 35, but said terminals are held in spaced relation with the sleeve by the collar 38 and the igniting unit is in spaced relation thereto. Therefore, there is no circuit between the terminals 35 and the igniting unit. The igniting unit through the metal sleeve 7 has electrical engagement with the sleeve 24, which is electrically connected with the instrument panel 3 having connection with the ground side of the battery of the automobile.

When it is desired to use the light in the igniting unit as for map reading and the like, the igniting unit is pushed inwardly as shown in Fig. 4 until the cup 10 engages the terminals 35, completing the circuit from the tubular member 42, terminals 35, cup 10, heating coil 11, rivet 9, spring 23, light bulb 17, tubular member 19, spring 20, metal sleeve 7, and sleeve 24 to the instrument panel 3. The resistance of the circuit is such that insufficient current will flow to heat the heating coil 11, but the current will energize the light bulb to direct a beam of light through the opening 16. When use of the light is completed, the igniting unit is retracted to the position shown in Fig. 3, breaking the circuits.

When it is desired to use the lighter, the igniting unit is pushed inwardly, as illustrated in Fig. 5, whereby the cup member 10 is engaged with the terminals 35 which have resiliency, tending to hold the igniter unit in place. The fingers 32 engage the metal sleeve 7 and also provide resilient engagement tending to hold the igniting unit in the deep or energizing position. The metal ferrule 8 engages the lugs 72 of the ring 70 and inward movement of the igniting unit compresses the spring 74. The spring 74, being compressed between the rings 69 and 70, exerts force on the body member tending to retract same from engagement with the terminals 35. The spring tension of the terminals 35 and fingers 32 being stronger than the spring 74, the igniting unit will be retained in place until the heating element reaches a predetermined temperature. Pushing the igniting unit into the sleeve makes contact between the terminals 35, cup 10, through the heating element 11, metal ferrule 8, lugs 72, sleeve 24, and instrument panel 3, to the ground side of the battery, thereby energizing the heating element to heat same to a desired temperature. It is to be noted that the finger 67 engages the igniting unit and retains the arm 66 in disengaged relation with the sleeve portion 25. When the heating element 11 reaches a predetermined temperature, radiated heat therefrom directed to the terminals 35 will cause expansion thereof and a reduction of the spring tension applied by the terminals, tending to hold the igniting unit in circuit-making position. Expansion of the terminals 35 releases the cup 10 and permits the spring 74 to overcome the resistance to outward movement of the igniting unit, permitting return of the igniting unit to the position shown in Fig. 3, the sound caused by the retractive movement of the igniting unit notifying the occupants of the automobile that the lighter is ready for use. The igniting unit may then be removed from the sleeve 17 and passed around the automobile for use of the occupants thereof.

When the igniter is removed from the sleeve, the spring tension of the arm 66 moves the end thereof toward the axis of the sleeve and into engagement with the enlarged portion 25, thereby completing the circuit from the filament of the light bulb 52, through the socket member 64 thereof, tubular member 50, flange 53, ring member 65, arm 66, sleeve portion 25, and the instrument panel 3, to the ground connection of the battery, thereby energizing said filament, causing the light to burn and direct the rays thereof forwardly through the sleeve 24 and out of the bore of the bushing 28, providing a direct beam of light from the opening of the lighter recess. The provision of the direct beam of light through the sleeve and into the passenger compartment of the automobile provides a visual indication of the location of the opening thereof without the driver removing his eyes from the road and facilitates the reinsertion of the igniting unit therein. Upon reinsertion of the igniting unit, it takes the position as illustrated in Fig. 2 until it is desired to use same again. It is also to be noted that partial insertion of the igniting unit or the removal thereof from the sleeve 24 provides a source of bright light which may be used for reading road maps, or the like, but being a directed beam does not light the entire interior of the passenger compartment and thereby does not interfere with the vision of the driver as is done when the entire passenger compartment is lighted by the conventional dome lights therein.

Figure 10:
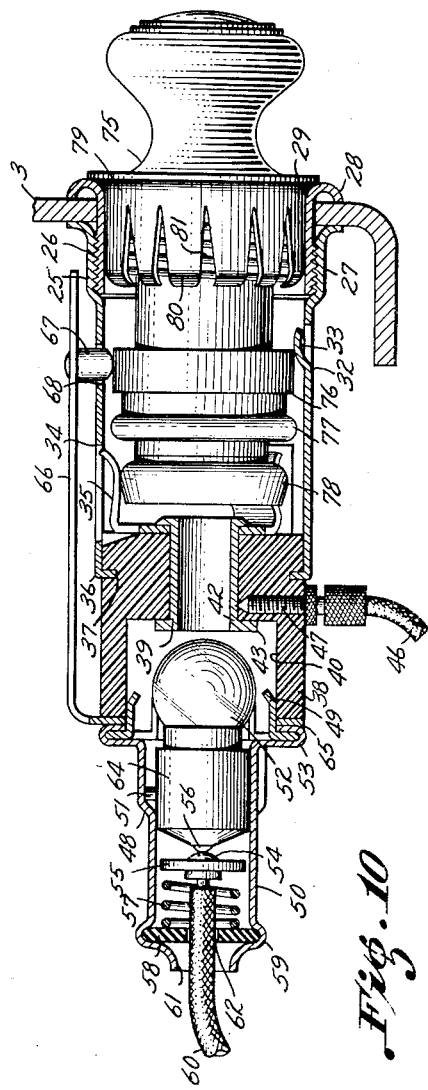
Fig. 10 is a sectional view similar to Fig. 9, the igniting unit being illustrated in circuit-completing position for energizing the heating element in the igniting unit.

In the form of the invention shown in Figs. 9 and 10 the same sleeve and the receptacle structure as shown in Figs. 3 to 6 inclusive is used, except for the rings and spring on the exterior of the sleeve. In the modified form the lighter is made automatic by using an igniting unit 75 having a body member 76 carrying a metal ferrule 77 and cup 78 in spaced relation at the inner end thereof, said cup being electrically connected to the ferrule through a heating element (not shown) located in the cup. The central portion of the body member is of reduced diameter and slideably carried thereon is a cylindrical clip member 79 having spring fingers 80 adapted to engage the bushing 28. The inner ends of the fingers 80 are turned down to engage a spring 81 the other end of which engages the body member adjacent the flange on the clip member for urging the clip member toward the inner end of the reduced diameter of the igniting unit. When the igniting unit is in the sleeve in storage position the flange on the clip member engages the outer end of the receptacle and the spring holds the body member in retracted position. Pushing the igniting unit into the sleeve compresses the spring 81 between the ends of the fingers 80 and the body member and effects expansion of the terminals 35 by engagement of the cup 78 therewith in the same manner as in the preferred form. Engagement of the cup and terminals completes the circuit to the heating element and a predetermined heat of said element causes the terminals 35 to expand and release the engagement with the cup permitting the spring 81 to expand and retract the igniting unit relative to the clip member. Withdrawal of the igniting unit energizes the light bulb 52 in the same manner as in the device shown in Fig. 6, directing a beam of light from the receptacle.

It is believed obvious that I have provided a simple, compact, efficient illuminating means for cigar lighters and the like to facilitate the locating of the opening for the lighting unit.

What I claim and desire to secure by Letters Patent is:

1. A cigar lighter comprising, a tubular metal socket having open ends and adapted to be mounted on the instrument panel of an automobile, said panel having connection with the ground electrical circuit thereof, an igniting unit adapted to be inserted in and removed from the socket for storage and use respectively, a heating element carried by the igniting unit, contact means for selectively connecting the heating element to a source of electric current for heating said element to incandescence for use, an insulating collar on the rear portion of said socket forming an extension thereof having a through coaxial bore therein, means securing the contact means to the insulating collar, said contact means and securing means having through bores aligning with the bore in the collar, a light bulb, means carrying said light bulb for insertion in the insulating collar for locating the light bulb in the bore thereof, means connecting the light bulb with the source of current, means having electrical connection with the light bulb carrying means and yieldingly engaging the socket when the igniting unit is removed from the socket for completing a circuit to the light bulb for energizing same, and means carried by the yielding means for contact with the igniting unit when inserted in the socket for moving the yielding means out of contact with said socket to render the light bulb inoperative.

2. A cigar lighter comprising, a tubular socket having open ends and adapted to be mounted on an instrument panel of an automobile, an illuminating means, means carrying the illuminating means and adapted to be mounted on the end of the tubular socket for positioning the illuminating means coaxial with the socket, yielding means for completing an electrical circuit between the illuminating means and the socket, an igniting unit for insertion in the socket for storage and removable from the socket for use, a heating element carried by the igniting unit, contact means for engaging the igniting unit when same is moved into the socket into igniting position for connecting the heating element to a source of electric current for bringing said element to incandescence, means supporting the contact means in the tubular socket, said contact means and supporting means having through bores coaxial with the socket for passage of light from the illuminating means, and means on the yielding means engaging the igniting unit for maintaining the illuminating means inoperative when the igniting unit is in the socket and for effecting completion of the circuit to the illuminating means when the igniting unit is removed from the socket whereby a beam of light is directed axially of the socket providing a directed light beam from said socket for locating same.

3. A cigar lighter comprising, a tubular socket having open ends and adapted to be mounted on an instrument panel of an automobile, a tubular extension of insulating material on said tubular socket, an illuminating means, means carrying the illuminating means for insertion in the end of the tubular extension for positioning the illuminating means coaxial with the socket, yielding means on the tubular extension for engaging the illuminating means carrying means, an igniting unit for insertion in the socket for storage and removable from the socket for use, a heating element carried by the igniting unit, contact means carried by the tubular extension and spaced from the axis of the socket for engaging the igniting unit when same is moved into the socket into igniting position for connecting the heating element to a source of electric current for bringing said element to incandescence, said means retaining the igniting unit in igniting position and releasing the igniting unit when the heating element reaches incandescence, means supporting the contact means in the tubular socket, said contact means and supporting means having through bores coaxial with the socket for passage of light from the illuminating means, and means on the yielding means engaging the igniting unit for maintaining the illuminating means inoperative when the igniting unit is in the socket and for effecting completion of the circuit to the illuminating means when the igniting unit is removed from the socket whereby a beam of light is directed axially of the socket providing a directed light beam from said socket for locating same.

4. A cigar lighter comprising, a tubular socket having open ends and apertures therein adapted to be mounted on an instrument panel of an automobile and have electrical connection therewith, means slidably mounted on the socket and having lugs extending through the apertures therein, resilient means engaging the sliding means for urging same toward the open end of said socket, an igniting unit adapted for insertion in the socket and removable therefrom for use, a heating element carried by the igniting unit, contact means spaced from the axis of the socket for engaging the igniting unit when the same is moved into the socket for connecting one end of the heating element to the source of electrical current, metal means on the igniting unit having electrical connection with the other end of the heating element, said metal means engaging the lug on the slidable member to compress the resilient means on the socket and complete electrical circuit from the heating element to the tubular socket on further movement of the igniting unit into the socket, said spaced means retaining the igniting unit in igniting position and releasing the igniting unit when the heating element reaches incandescence, whereby the resilient member moves the igniting unit outwardly in the socket to interrupt electrical circuit thereto, an insulating collar on the rear portion of said socket forming an extension thereof having a through coaxial bore therein, means securing the contact means on the collar in the tubular socket, said contact means and securing means having through bores aligning with the bore in the collar, a light bulb, means carrying said light bulb for insertion in the insulating collar for locating the light bulb in the bore thereof, means connecting the light bulb with a source of current, means having electrical connection with the light bulb carrying means and yieldingly engaging the socket when the igniting unit is removed from the socket for completing a circuit to the light bulb for energizing same, and means carried by the yielding means for contact with the igniting unit when inserted in the socket for removing the yielding means out of contact with said socket to render the light bulb inoperative.

5. A cigar lighter comprising, a tubular socket having open ends, one end being adapted to be mounted on an instrument panel of an automobile, an extension of insulating material fixed on the other end of said tubular socket and having an axial bore therein, said extension having an axial counter bore therein opening to the end of the extension opposite the tubular socket, an illuminating means, means carrying the illuminating means for insertion in the counterbore of the tubular extension for positioning the illuminating means coaxial with the socket, yielding means on the tubular extension for engaging the illuminating means carrying means, an igniting unit for insertion in the socket for storage and removal from the socket for use, a heating element carried by the igniting unit, contact means on the end of the extension in the tubular socket, means for securing the contact means to the extension, said contact means and securing means having through bores aligned with the bore of the extension for passage of light from the illuminating means, a plurality of fingers on the contact means to grip and cooperate with the igniting unit to close and energize the circuit thereto when the igniting unit is moved into igniting position in the socket, said fingers releasing the igniting unit when the heating element reaches incandescence, and means on the yielding means engaging the igniting unit for maintaining the illuminating means inoperative when the igniting unit is in the socket and for effecting completion of the circuit to the illuminating means when the igniting unit is removed from the socket whereby a beam of light is directed axially of the socket providing a directed light beam from said socket for locating the same.

WILFRED R. WALTNER, Jr.

REFERENCES CITED

The following references are of record in the file of this patent:

UNITED STATES PATENTS

| Number | Name | Date |
|---|---|---|
| 1,775,024 | Douglas | Sept. 2, 1930 |
| 1,978,934 | Douglas | Oct. 30, 1934 |
| 2,043,054 | Marty et al. | June 2, 1936 |
| 2,144,376 | Johnson | Jan. 17, 1939 |
| 2,260,588 | Smith | Oct. 28, 1941 |
| 2,363,674 | Johnson | Nov. 28, 1944 |
| 2,419,950 | Johnson | May 6, 1947 |